US012437005B2

(12) United States Patent
Kaplingat et al.

(10) Patent No.: US 12,437,005 B2
(45) Date of Patent: Oct. 7, 2025

(54) FILE METADATA SERVICE

(71) Applicant: NetApp Inc., Sunnyvale, CA (US)

(72) Inventors: Nikhil Bhavadas Kaplingat, Karnataka (IN); Mohankumar Ganesan, Karnataka (IN); Rajasekar P, Tamilnadu (IN); Guru Prashanth Thanakodi, Erode (IN); Rashid Shabbir Nadaf, Dharwad (IN)

(73) Assignee: NetApp, Inc., San Jose, CA (US)

( * ) Notice: Subject to any disclaimer, the term of this patent is extended or adjusted under 35 U.S.C. 154(b) by 881 days.

(21) Appl. No.: 17/130,183

(22) Filed: Dec. 22, 2020

(65) Prior Publication Data
US 2022/0197944 A1    Jun. 23, 2022

(51) Int. Cl.
G06F 16/30 (2019.01)
G06F 16/901 (2019.01)
G06F 16/9035 (2019.01)
G06F 16/906 (2019.01)
G06F 16/907 (2019.01)

(52) U.S. Cl.
CPC .......... G06F 16/907 (2019.01); G06F 16/901 (2019.01); G06F 16/9035 (2019.01); G06F 16/906 (2019.01)

(58) Field of Classification Search
None
See application file for complete search history.

(56) References Cited

U.S. PATENT DOCUMENTS

| | | | | |
|---|---|---|---|---|
| 7,730,113 B1 * | 6/2010 | Payette | ............... | G06Q 10/00 709/224 |
| 8,862,558 B2 * | 10/2014 | Esaka | ............... | G06F 16/13 707/692 |
| 9,104,675 B1 * | 8/2015 | Clark | ............... | G06F 16/13 |
| 10,534,759 B1 * | 1/2020 | Manjunath | ............... | G06F 16/128 |
| 2003/0220985 A1 * | 11/2003 | Kawamoto | ............... | G06F 3/0643 709/219 |
| 2006/0206547 A1 * | 9/2006 | Kulkarni | ............... | G06F 21/6218 |
| 2009/0043774 A1 * | 2/2009 | Sudhakar | ............... | G06F 16/1873 707/999.009 |
| 2009/0100115 A1 * | 4/2009 | Park | ............... | G06F 3/0643 |
| 2009/0276456 A1 * | 11/2009 | Neubacher | ............... | G06F 16/2219 |
| 2012/0290558 A1 * | 11/2012 | Gruber | ............... | G06F 16/951 707/711 |
| 2013/0110787 A1 * | 5/2013 | Garimella | ............... | G06F 16/113 707/E17.007 |
| 2016/0092312 A1 * | 3/2016 | Dornquast | ............... | G06F 16/1844 707/692 |
| 2017/0177452 A1 * | 6/2017 | Parab | ............... | G06F 3/0641 |
| 2018/0062952 A1 * | 3/2018 | Sherkhonov | ............... | H04L 43/04 |
| 2018/0150548 A1 * | 5/2018 | Shah | ............... | G06F 16/285 |

(Continued)

*Primary Examiner* — Khanh B Pham
(74) *Attorney, Agent, or Firm* — Cooper Legal Group, LLC

(57) ABSTRACT

Techniques are provided for a maintaining and utilizing a file index and a file version index. Metadata may be evaluated to identify constant attributes and modifiable attributes of files. A file index of a file catalog may be populated with the constant attributes. A file version index of the file catalog may be populated with the modifiable attributes as file versions of the files. In response to receiving a request for a file, the file index and the file version index are evaluated to identify a location of the file within a data source. Access to the file at the location within the data source is provided.

20 Claims, 11 Drawing Sheets

(56) References Cited

U.S. PATENT DOCUMENTS

| | | | |
|---|---|---|---|
| 2019/0007357 A1* | 1/2019 | Barad | H04L 51/18 |
| 2020/0233751 A1* | 7/2020 | Gupta | G06F 16/9027 |
| 2020/0250049 A1* | 8/2020 | Lee | G06F 11/1471 |
| 2021/0271554 A1* | 9/2021 | Saad | G06F 11/1435 |
| 2021/0297262 A1* | 9/2021 | Fang | G06F 9/54 |

* cited by examiner

FILE METADATA SERVICE

BACKGROUND

Various storage environments may store structured data and/or unstructured data. Structured data may correspond to files associated with a particular application (e.g., a text file associated with a word processing application; a music file associated with a music player application; etc.). These files of structured data can be easily identified as belonging to the application that has defined and formatted the files according to a particular structure used by the application to format and store data. Thus, these files of structured data are relatively easy to locate and manage because of the defined structure and association with the application. In contrast, unstructured data may correspond to files spanning different file types and attributes within a file system. Identifying and managing unstructured data and metadata of the unstructured data may be relatively difficult, and becomes more difficult when the unstructured data spans various data sources, such as network attached storage (NAS), virtual and/or physical storage area network file systems (SAN), on-premise storage, cloud storage, virtual disks, etc.

DETAILED DESCRIPTION

Figure 1:
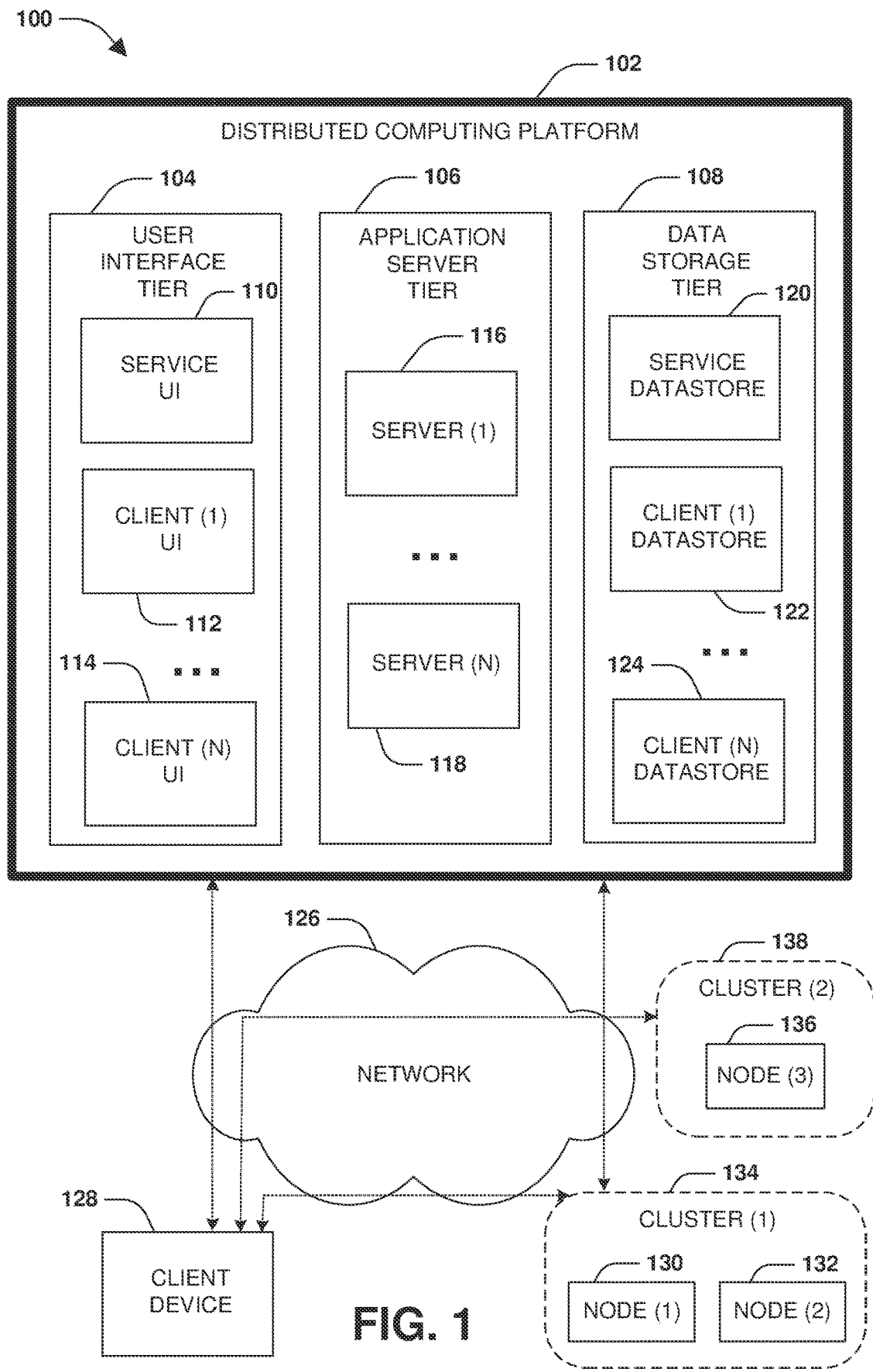
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

The techniques described herein are directed to a scalable, performant, and cost optimized file metadata service that is capable of cataloging metadata of unstructured file data of files from various data sources. The file metadata service may create, populate, and utilize a file catalog of metadata to expose application programming interfaces (APIs) to client devices. The client devices may utilize the APIs to perform various actions upon the files, such as locating files, browsing files through a user interface, restoring particular versions of files, tracking files and file versions stored within backups and snapshots, and generating reports regarding files (e.g., files consuming the most storage, files that are frequently modified, etc.). This file metadata service has a catalog engine that is configured to catalog the metadata into a file index and a file version index of the file catalog according to a catalog engine schema. The file index and the file version index can be used to locate particular versions of files that may be stored across various data sources so that actions can be performed upon such files. The catalog engine and the catalog engine schema can be horizontally scaled (e.g., infinitely scaled) because the file catalog can be partitioned once a configurable threshold is reached (e.g., once metadata of a certain number of files has been cataloged), thus allowing for scaling on demand by creating new partitions of the file index and the file version index as needed. In an example, the catalog engine utilizes a catalog server for storing the catalog data, which can be horizontally scaled as the file catalog grows, such as by adding additional nodes for managing the storage of the file catalog.

The catalog engine is cost optimized because the file catalog can be run on-premise or in the cloud, and also older partitions of the file catalog can be stored within relatively cheaper storage, such as cloud storage. For example, a current/live partition of the file version index may be stored in performant storage and updated as new metadata is retrieved, while older partitions of the file index and file version index may be archived and tiered out to more cost effective storage. In particular, write operations that are implemented to catalog metadata are executed upon a latest/live partition of the file catalog that may be stored within relatively faster storage without having to access older/archived partitions that may be stored in cheaper/slower storage since new metadata entries are incrementally added into the latest/live partitions of the file index and file version index of the file catalog. In this way, the catalog workflow of the catalog engine is very performant as well as cost effective. That is, the catalog engine is executing the write operations to catalog the metadata as new entries within the latest/live partition of the file catalog (e.g., incrementally adding to the file catalog as new versions of files are identified/discovered), which also makes the catalog workflow very performant as opposed to otherwise locating and updating older entries within the file catalog.

The catalog engine may be implemented as micro-services running inside a containerized environment that can be horizontally scaled for multiple catalog instances. Nodes can be automatically added to a containerized cluster on demand to ensure cataloging by the catalog engine is performant. The file metadata service has a catalog ingestion engine that retrieves the metadata for cataloging, which can be scaled up/down based upon current demand, such as heavy demand when a new snapshot is created with modified files having metadata to catalog.

The file metadata service exposes APIs to client devices for performing various actions upon files and versions of the files that can be located using the file index and the file version index of the file catalog. Searching the file index and file version index for a particular file based upon a file path or other attributes of the file is very performant even though the search may be across a large number of data sources, files, and file versions, such as thousands or millions of files and file versions.

In an embodiment of implementing the file metadata service, the catalog ingestion engine is configured to access various data sources within which unstructured file data of files may be stored on behalf of client devices, such as unstructured file data within a network attached storage (NAS) filer (e.g., data within a volume managed by a storage operating system), a virtual or physical storage area network (SAN) file system (e.g., data within a LUN), virtual disks of virtual machines, cloud storage, and/or a wide variety of other diverse data sources. The catalog ingestion engine may retrieve metadata describing attributes of the unstructured file data from the data sources. In an embodiment, the catalog ingestion engine may utilize various protocols to find files, such as a snapshot difference protocol that can identify changed files between two snapshots, an i-notify function of an operating system that can be used to understand file information and file modification information. Depending on a current demand for ingesting (retrieving) metadata, resources allocated to the catalog ingestion engine may be increased (e.g., high demand when a new snapshot has been taken, and thus new versions of files are to be identified for cataloging metadata of the new file erosion's) or decreased.

Once the metadata has been retrieved, the file metadata service (e.g., one or more catalog engine micro-services) evaluates the metadata to identify constant attributes of files. The constant attributes may correspond to attributes that remain constant over the lifetime of the files, such as an inode of a file, a creation time of the file, a file path of the file, a cluster identifier of a cluster at which the file is stored, a volume identifier of a volume within which the file is stored, etc. The file metadata service evaluates the metadata to identify modifiable attributes of the files. The modifiable attributes may correspond to attributes that can change over the lifespan of the files, such as a last modified date, a file size, etc.

The file metadata service (e.g., the catalog engine microservices working in conjunction with a catalog server hosted by one or more nodes that store catalog data) populates a file index of a file catalog with the constant attributes in a format corresponding to the catalog engine schema. In an example of populating the file index according to the catalog engine schema, an entry for a file may comprise a global identifier (e.g., a globally unique identifier) for the file and/or the constant attributes of the file. The global identifier may be based upon the constant attributes, such as a hash of the constant attributes.

The file metadata service also populates a file version index of the file catalog with the modifiable attributes as file versions of the file according to the catalog engine schema. For example, a file at a first point in time may correspond to a first file version of the file having a first set of modifiable attributes, which are stored within the file version index as a first entry for the first file version of the file. At a second point in time, the file may be modified as a second file version of the file having a second set of modifiable attributes (e.g., a size and a last modified attribute may have changed based upon a write to the file since the first point in time), which are stored within the file version index as a second entry for the second file version. In this way, sets of modifiable attributes of a file may be stored as entries within the file version index as ever incrementally increasing entries (e.g., each new version of the file is stored as a new entry instead of overwriting a prior entry for the file). In an embodiment, different versions of a file may be identified by comparing snapshots of a volume comprising the file in order to determine whether the file has been modified since a prior snapshot. In an embodiment, the number of nodes that host the catalog server that stores the catalog data may be dynamically modified based upon one or more parameters, such as where additional nodes are added for hosting the catalog server as more catalog data is being maintained.

Figure 6:
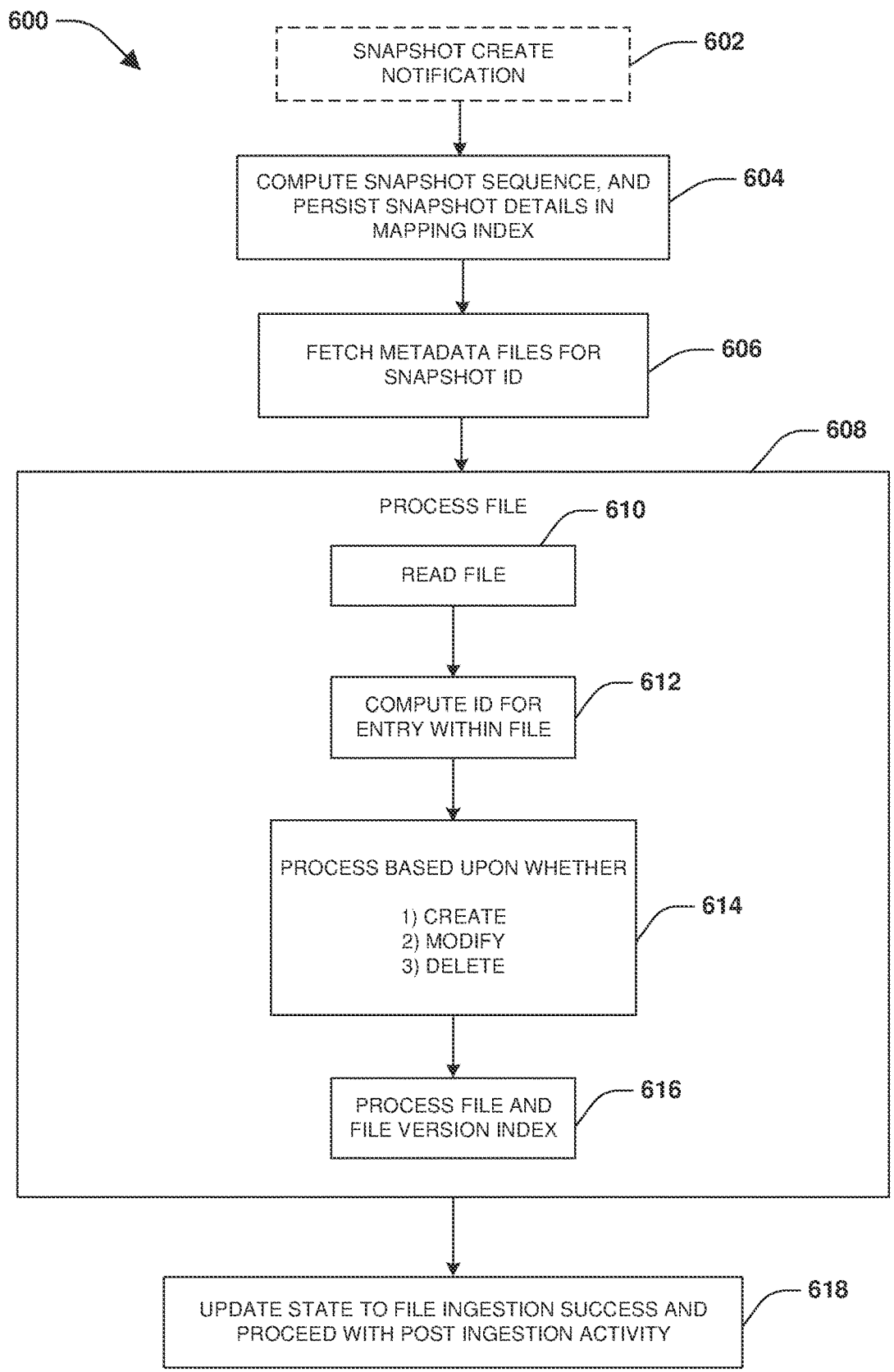
FIG. 6 is a flow chart illustrating an example method for updating a file index and a file version index based upon a snapshot being created.

The file catalog, such as the file version index, may be partitioned based upon various criteria so that older partitions can be moved to relatively cheaper storage such as cloud storage while a latest current/live partition can be maintained within relatively faster storage (e.g., on-premise) in order to improve performance so that write operations used to catalog metadata are directed to the latest current partition within the faster storage. For example, in response to metadata of a threshold number of file versions of files being stored within the file catalog (e.g., a threshold number of entries comprising sets of modifiable attributes being stored within the file version index), the file catalog such as the file version index is partitioned to create a new file version index into which modifiable attributes of subsequent versions of the files are stored. In this way, the partitioned off older file version index can be moved to more cost effective storage, while the new file version index can be maintained within relatively more performant storage. FIG. 6 illustrates a workflow of updating the file index and the file version index based upon a snapshot being created, which will be subsequently described in further detail.

The file metadata service may expose various APIs to client devices so that clients (e.g., users, storage operating systems, etc.) can access and perform actions upon the files identifiable using the file index and the file version index. In an example, a request is received from a client device through an API by the file metadata service. The request may request access to a file (e.g., a particular version of the file). The request may comprise file arguments associated with the file, such as one or more constant attributes of the file (e.g., an inode of the file, a creation time of the file, a file path of the file, a cluster identifier of a cluster at which the file is stored, a volume identifier of a volume within which the file is stored, etc.). The file metadata service may utilize the file arguments to construct a global identifier for the file (e.g., a hash of the constant attributes of the file), which may be associated with an entry within the file index for the file and one or more entries within the file version index corresponding to file versions of the file. Accordingly, the global identifier is used to query the file index and/or the file version index to identify a location of the file (e.g., the requested version of the file) within a data source at which the file is stored (e.g., a cluster attribute, an inode attribute, a volume attribute, or other attributes may be indicative of the data source). In this way, access to the file at the location within the data source is provided to the client device so that various actions can be performed upon the file.

Figure 4:
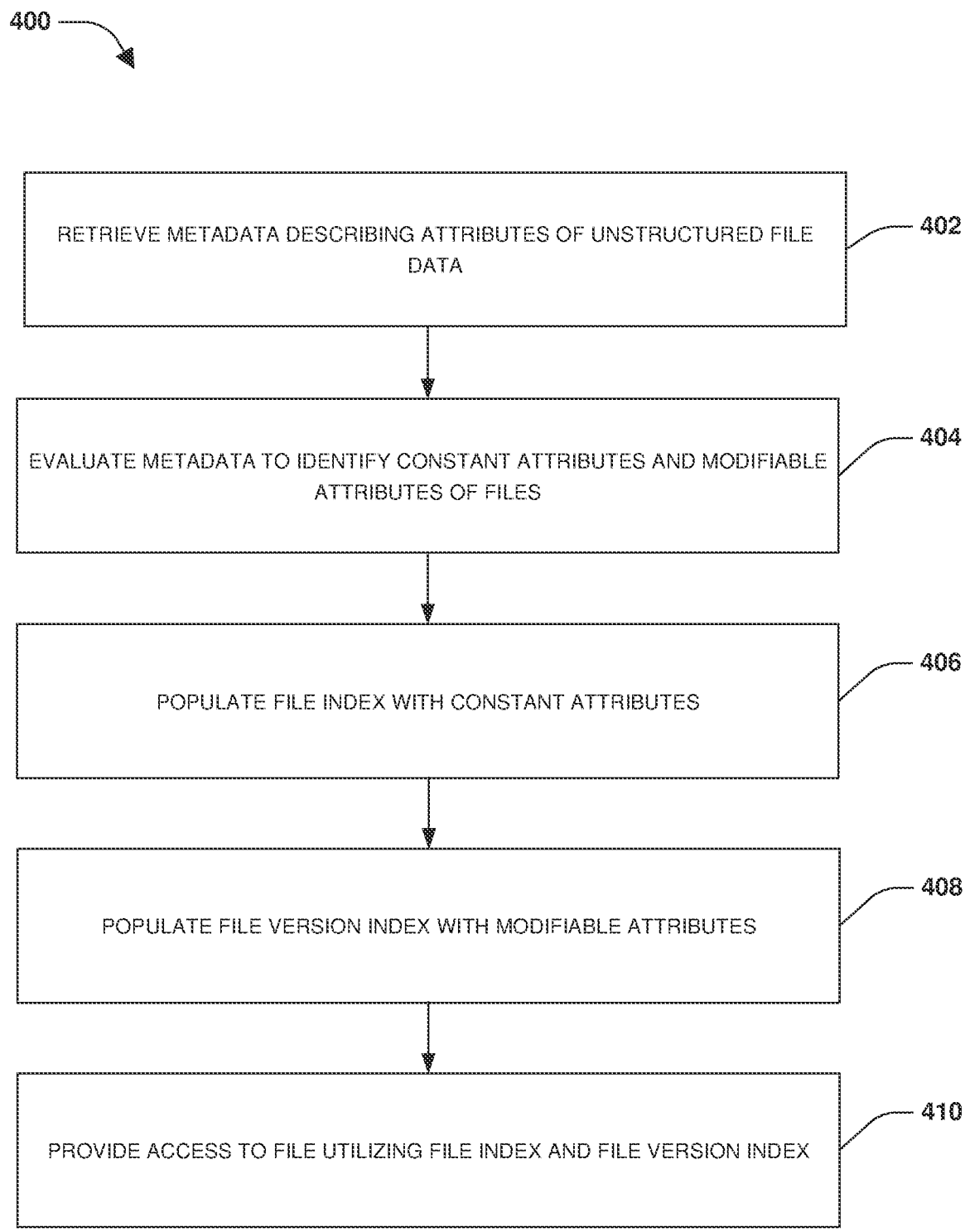
FIG. 4 is a flow chart illustrating an example method for maintaining a file index and a file version index.
Figure 5:
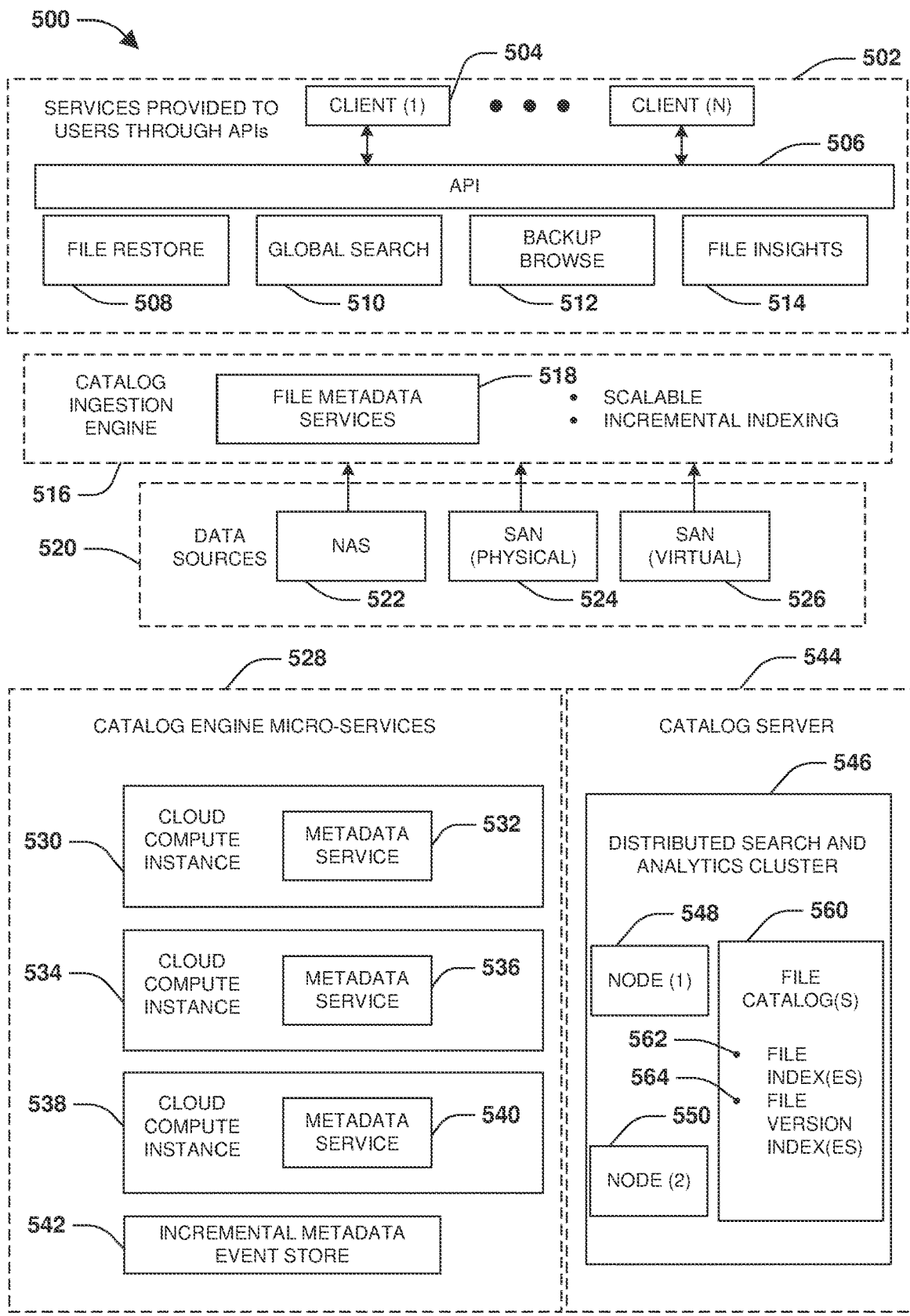
FIG. 5 is a block diagram illustrating an example system for implementing a file metadata service.

In an example of providing access to the file, the request may specify that the file is to be restored to a particular file version of the file. Accordingly, the file index and the file version index are evaluated and utilized to obtain the file version of the file from the data source (e.g., a particular file version of the file that is captured within a snapshot) so that the file can be restored at a destination location to the file version. FIG. 4 illustrates a workflow of maintaining the file index and file version index, and FIG. 5 illustrates a system configured to implement the file metadata service, which will be subsequently described in further detail.

In an embodiment, a client device may utilize the APIs to request various types of reports regarding the files stored across the data sources. In an example, a request may be received for a report of files stored across the data sources that are modified above a threshold frequency. The file index and the file version index may be evaluated to identify a set of files that are modified above the threshold frequency. For example, the file version index comprises separate entries for each file version of a file (e.g., each time the file is modified, a new file version is stored as an entry within the file version index). Thus, the number of entries within the file version index over a particular timespan may be indicative of how frequently the file is modified.

In another example, a request may be received for a report of files across the data sources that have sizes greater or less than a threshold size (e.g., a number of files consuming the most storage). The file index and the file version index may be evaluated to identify a set of files that have sizes greater or less than the threshold size (e.g., a top X number of largest files). For example, the file version index may comprise modifiable attributes corresponding to file sizes of files, which may be used to identify the set of files having sizes greater or less than the threshold size. It may be appreciated that a variety of other types of reports may be generated.

The file index and the file version index may be used to construct and provide a browsing interface that can be exposed to client devices for browsing files and backups stored within the data sources (e.g., a graphical user interface that a user can actively navigate through a structure organizing the files, such as a tree, filesystem, or directory structure). For example, the file index and the file version index may be used to identify files, locations of the files, file versions of the files, and locations of the file versions of the files, which may be used to construct and populate the browsing interface. In this way, a client can utilize the browsing interface to view and browse files and backups of files stored across data sources so that particular files and backups can be identified and accessed for performing actions (operations) upon the files and backups, such as to restore files from a particular backup.

Figure 7:
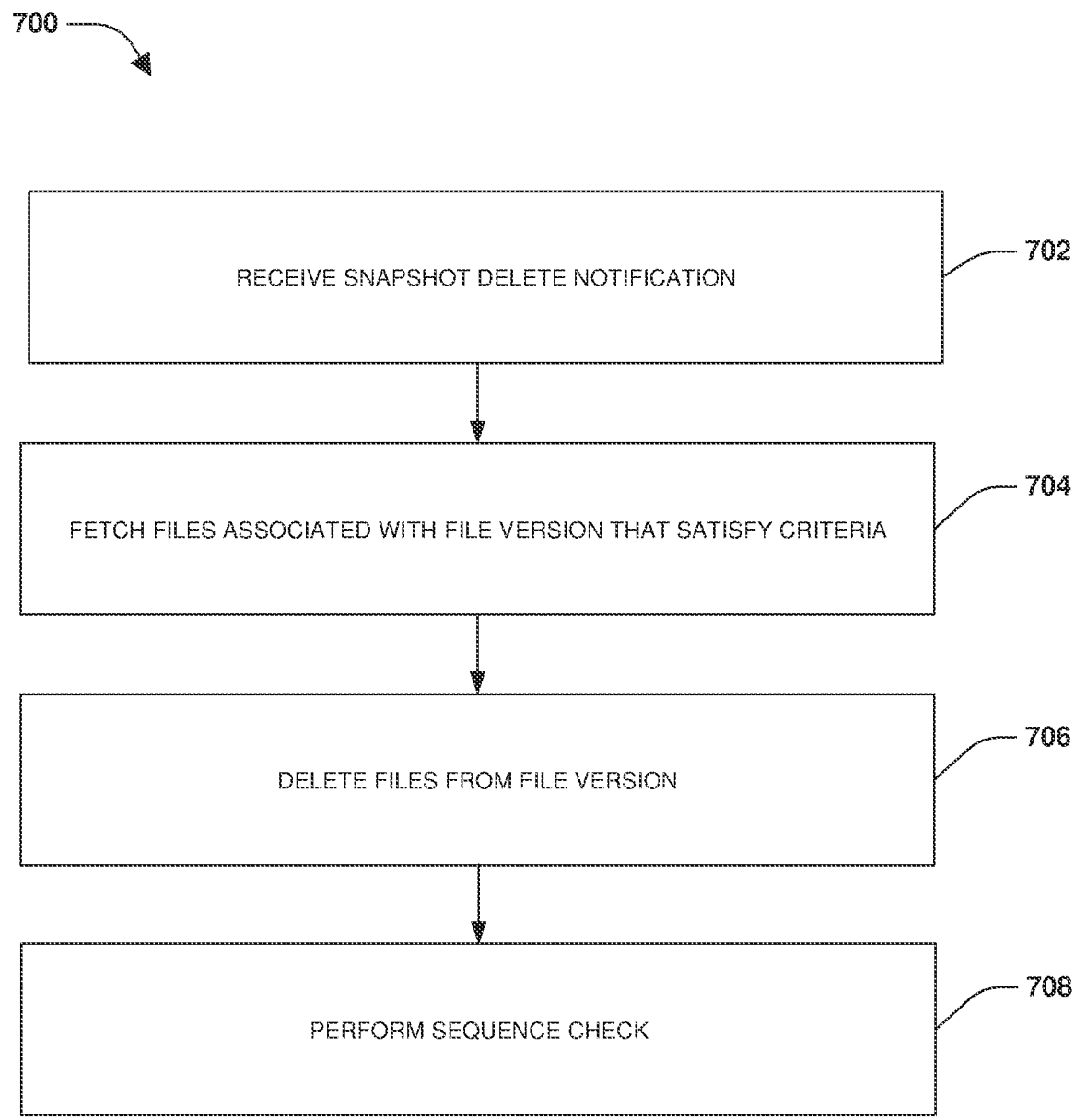
FIG. 7 is a flow chart illustrating an example method for processing a snapshot deletion that occurred in-order.
Figure 8:
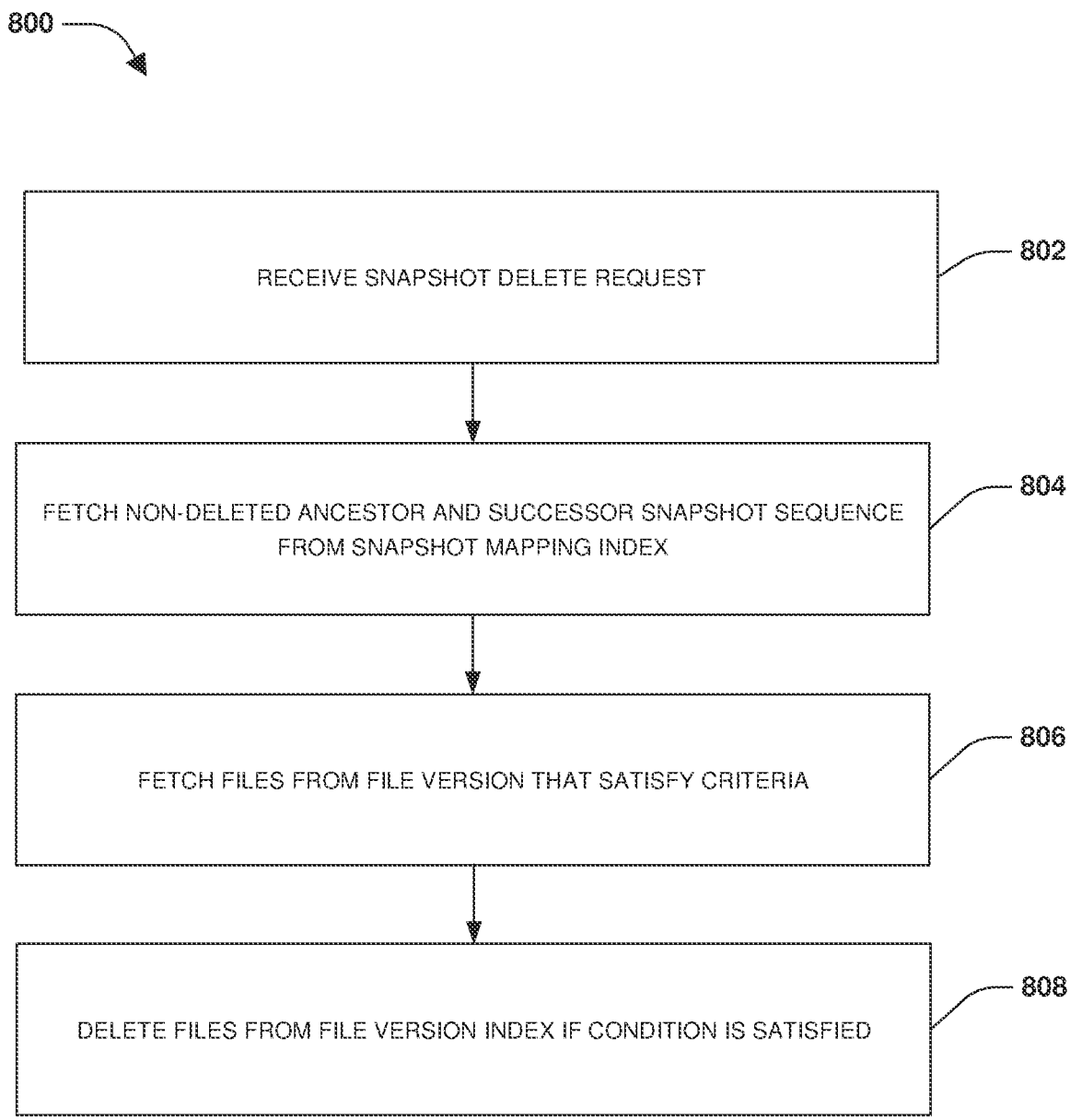
FIG. 8 is a flow chart illustrating an example method for processing a snapshot deleted that occurred out-of-order.
Figure 9:
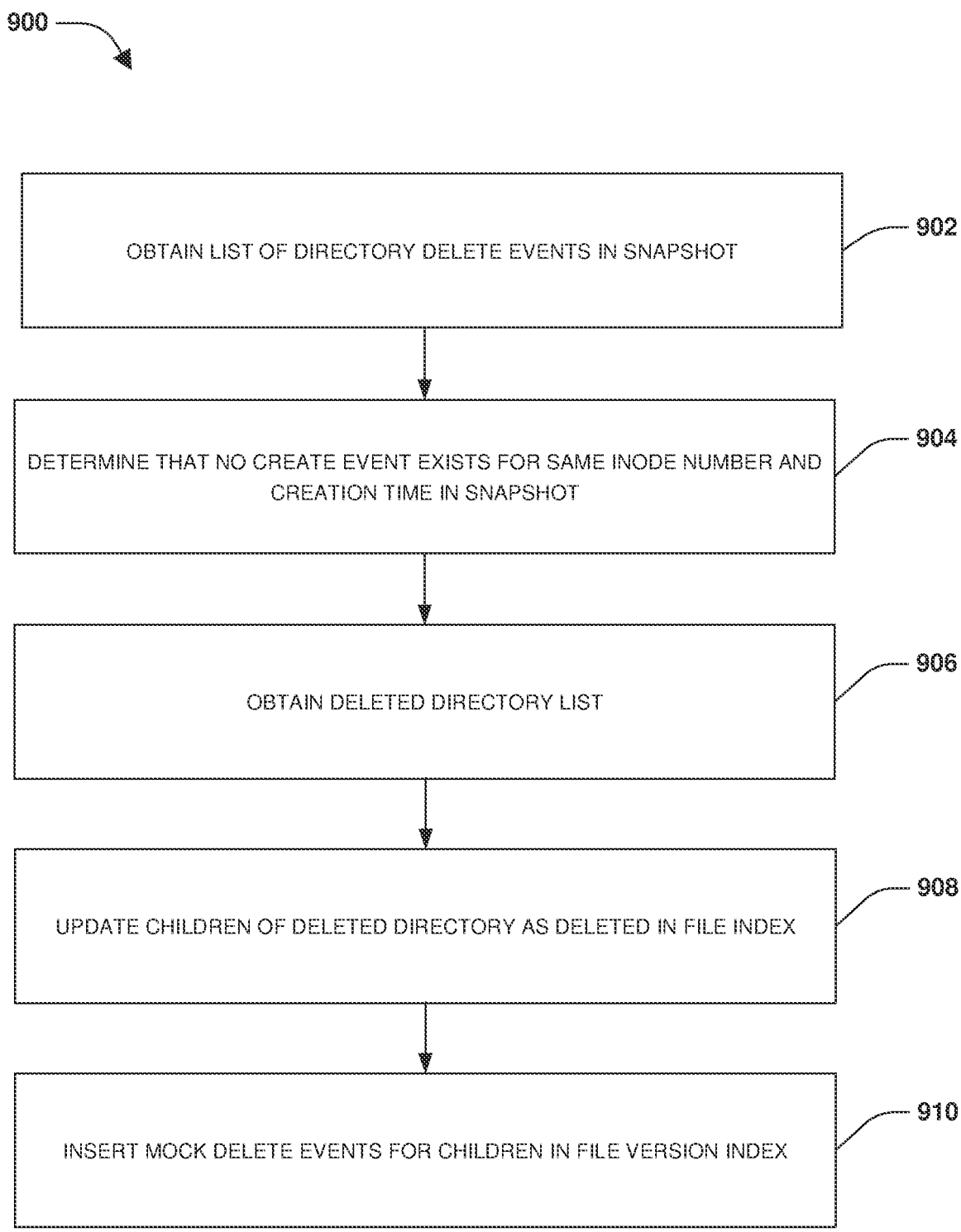
FIG. 9 is a flow chart illustrating an example method for handling a directory being deleted.
Figure 10:
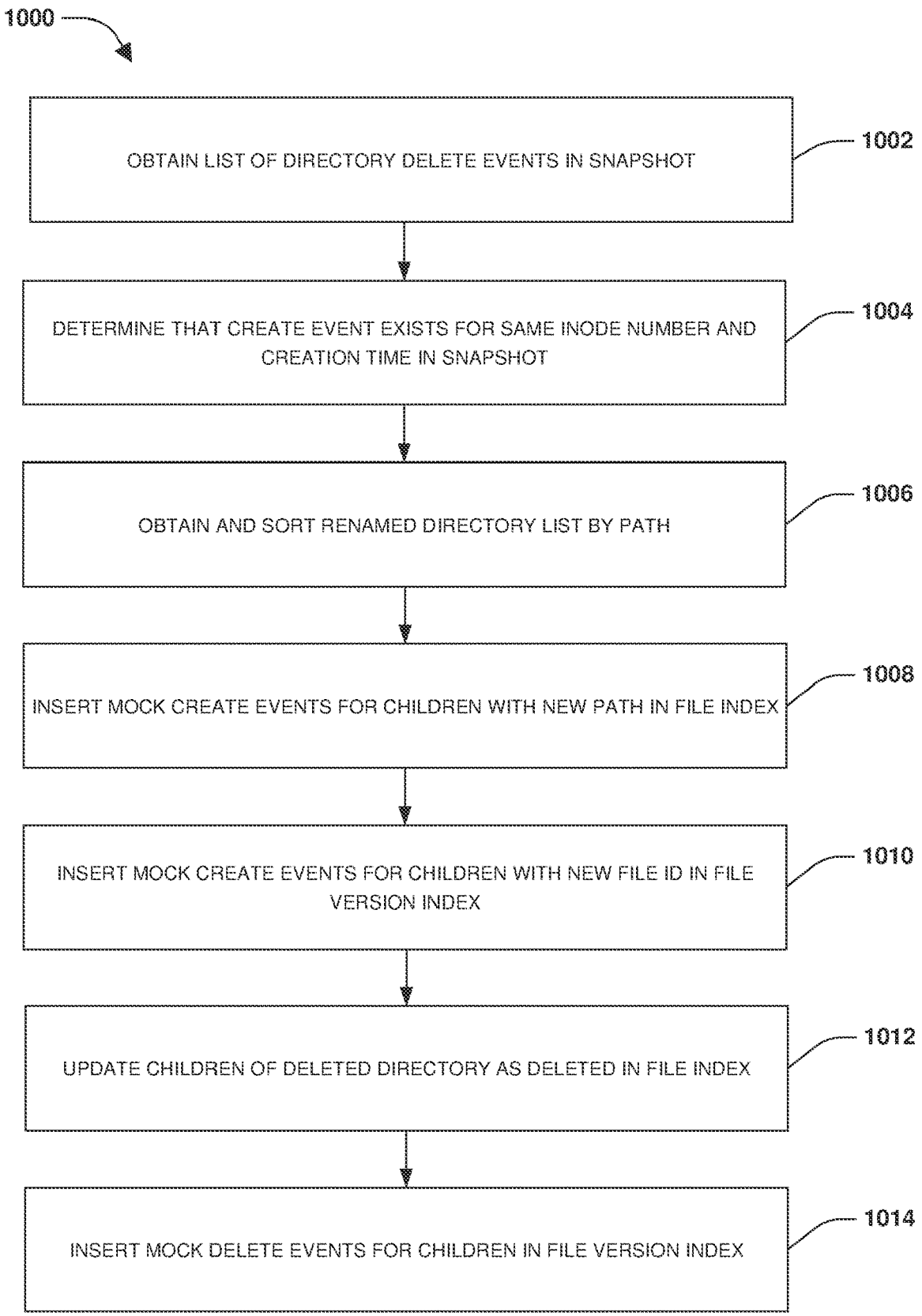
FIG. 10 is a flow chart illustrating an example method for handling a directory being renamed.

Various operations executed upon files, directories, volumes, etc. at the data sources may affect the file index and the file version index. In an example, a snapshot of a volume at a data source may be created. The snapshot may be compared with a prior snapshot to identify modified files that are new versions of files whose metadata is to be cataloged within the file catalog. In another example, the snapshot may be deleted. Accordingly, one or more file versions may be deleted from the file version index based upon the deletion of the snapshot. FIGS. 7 and 8 illustrate workflows associated with snapshots being deleted in-order and out-of-order, which will be subsequently described in further detail. In another example, a directory within a data source may be modified (e.g., deleted or renamed), which can affect files within the directory (e.g., deletion of the files, modifications of file paths or names of the files, etc.). Accordingly, files affected by the modification of the directory may be identified, and the file version index and/or the file index may be modified based upon the affected files. FIGS. 9 and 10 illustrate workflows associated with handling a directory being deleted/renamed, which will be subsequently described in further detail.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a one or more file systems to logically organize data within storage devices as one or more storage objects and provide a logical/virtual representation of how the storage objects are organized on the storage devices (e.g., a file system tailored for block-addressable storage, a file system tailored for byte-addressable storage such as persistent memory). A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that the file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
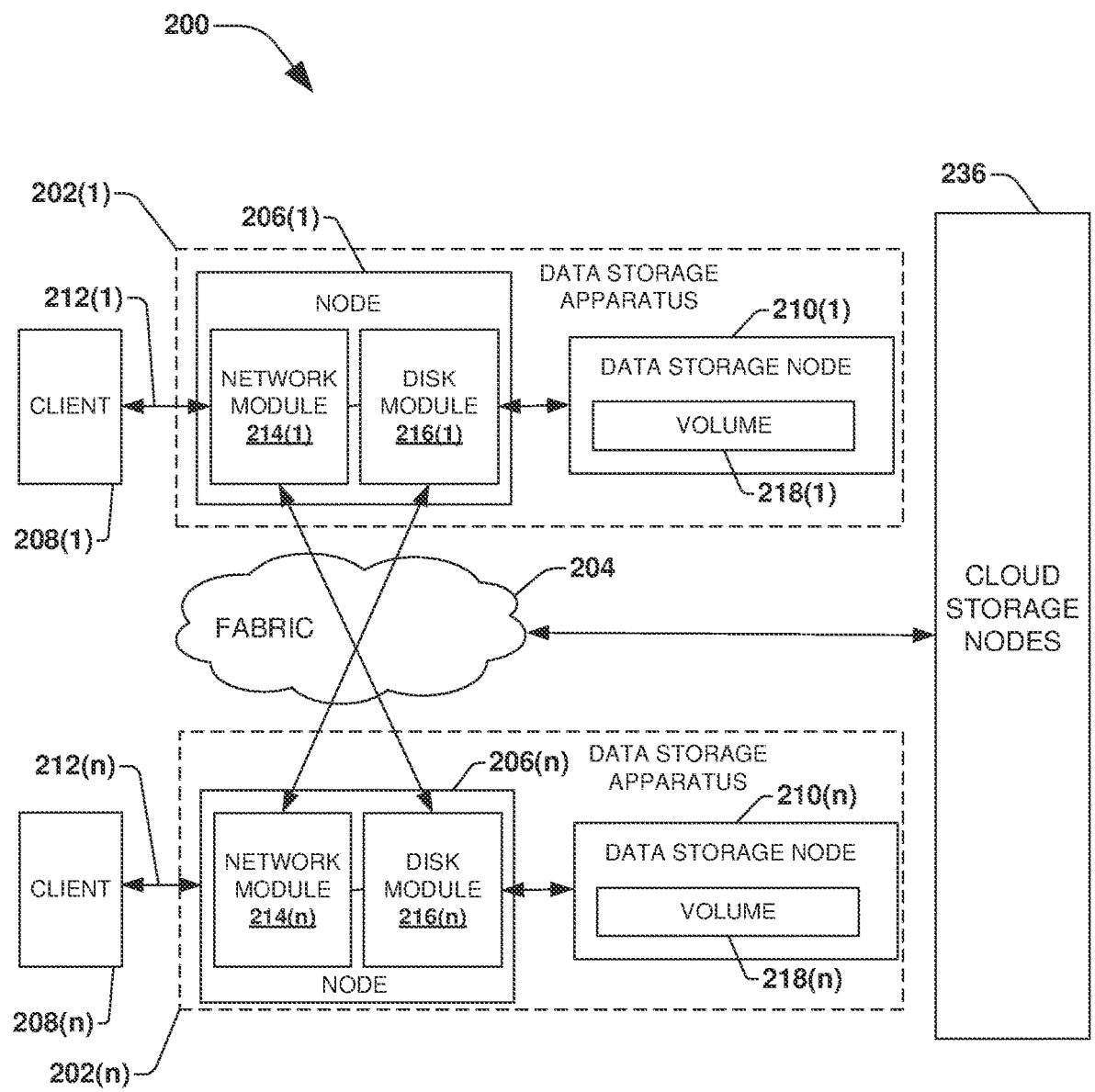
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
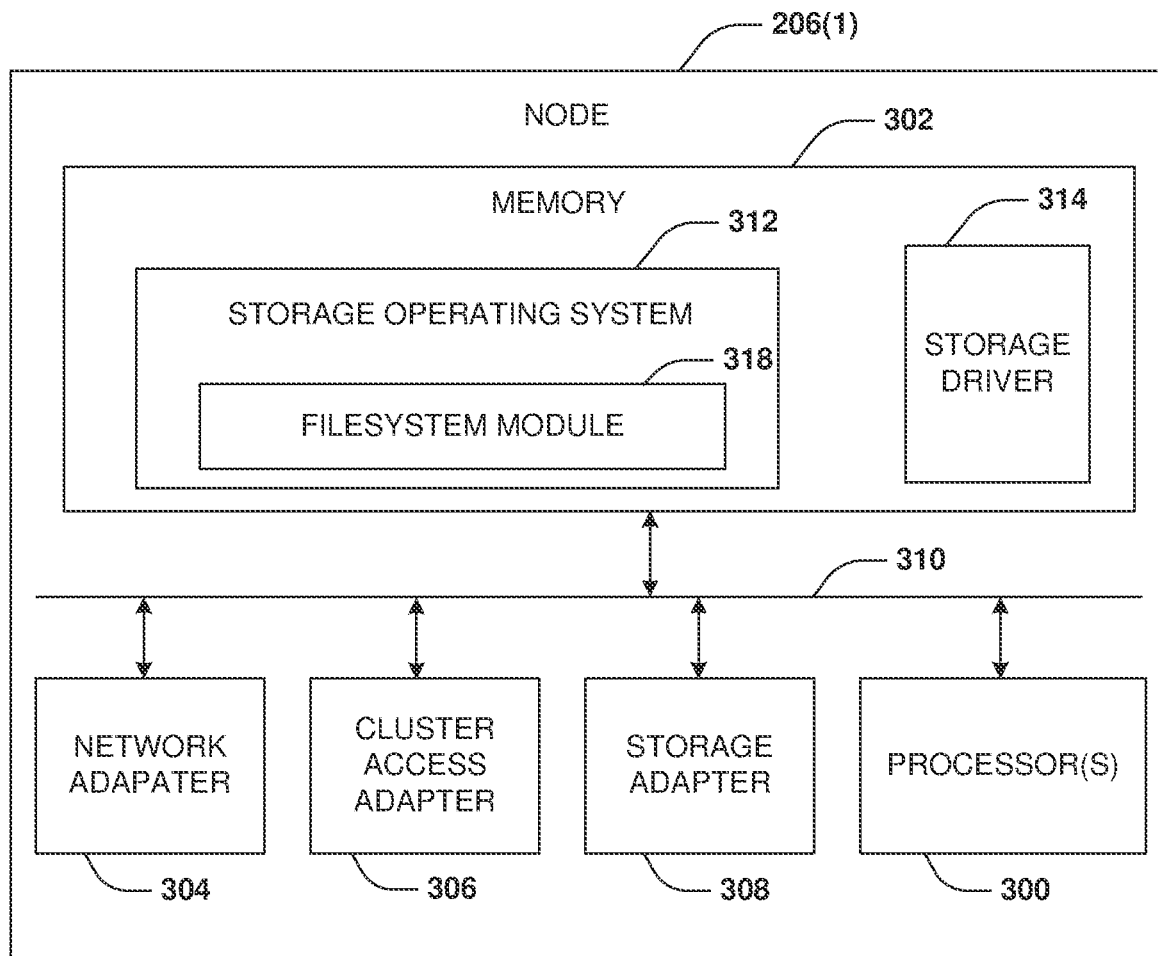
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1). In an example, a file system may be implemented for persistent memory.

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(n) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

In the example, the node computing device 206(1) comprises persistent memory 320. The persistent memory 320 comprises a plurality of pages within which data can be stored. The plurality of pages may be indexed by page block numbers.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

One embodiment of maintaining a file index and a file version index is illustrated by an exemplary method 400 of FIG. 4, which is further described in conjunction with system 500 of FIG. 5. Unstructured file data of files may be stored across various data sources 520, such as network attached storage 522 (e.g., a NAS filer/node), a physical storage area network 524 (physical SAN), a virtual storage area network 526 (virtual SAN), virtual machines, computing devices, hardware, software or combination thereof. The unstructured file data may be associated with metadata that may be mined from these data sources 520, such as by utilizing a catalog ingestion engine 516. The catalog ingestion engine 516 may implement various application programming interfaces (APIs), such as through a file metadata service 518 in order to retrieve the metadata. According, during operation 402 of method 400 of FIG. 4, the metadata describing attributes of the unstructured file data may be retrieved from the data sources 520, such as by the file metadata services 518 of the catalog ingestion engine 516. The catalog ingestion engine 516 may be scalable, provide incremental indexing, and/or may be storage and compute cost optimized. In an example, an amount of resources allocated for the catalog ingestion engine 516 to retrieve the metadata may be dynamically modified based upon a current demand for ingesting the metadata. For example, additional resources may be allocated to the catalog ingestion engine 516 when a threshold amount of metadata is to be retrieved by the file metadata services 518 (e.g., a new snapshot has been created, and a large amount of metadata associated with file changes within the snapshot since a prior snapshot are to be retrieved). In this way, the catalog ingestion engine 516 may be scaled up or down on-demand when heavy ingestion is needed such as when routine snapshots have been created for volumes, and thus a large amount of metadata associated with the snapshots is to be retrieved.

The catalog ingestion engine 516 may store the metadata within a catalog server 544, such as within a first node 548, a second node 550, and/or other nodes of a distributed search and analytics cluster 546 of the catalog server 544. The number of nodes used to host the catalog server 544 for storing the metadata may be dynamically modified based upon various parameters. Such parameters having an impact on node count may correspond to a total number of files managed by the catalog server, a total number of file versions managed by the catalog server, a rate of modification of files in a given period of time (e.g., a number of files modified per day), a number of replica copies of file catalog information that need to be stored, a specified rate of ingestion, etc. As the file catalog grows over time, the number of nodes can dynamically grow to accommodate the increase. In this way, the catalog server is elastic and can be horizontally scaled as a file catalog of the metadata grows.

In an embodiment, the file metadata services 518 may be implemented as or associated with a set of catalog engine micro-services 528 used to catalog the metadata into a file catalog stored by the nodes of the distributed search and analytics cluster 546 of the catalog server 544. The set of catalog engine micro-services 528 may be implemented as a first file metadata service 532 within a first cloud compute instance 530, a second file metadata service 536 within a second cloud compute instance 534, a third file metadata service 540 within a third cloud compute instance 538, and/or as other file metadata services hosted within other cloud compute instances. The set of catalog engine micro-services 528 may implement an incremental metadata event store 542 in order to incrementally store metadata events. In an example, the incremental metadata event store 542 corresponds to the index scheme. A list of created/modified/deleted files between two snapshots/time points is retrieved utilizing an engine (e.g., a snap-difference engine or an inotify function of an operating system). Creations and deletions are recorded in a file index as well. The modified files are stored as file versions in the file index. Once initial indexing is done for a volume, subsequent indexing is based on the incremental information (e.g., a volume may have 1 million files of which 1% of files are modified daily, thus the initial indexing indexes the 1 million files, while subsequent indexing indexes merely the modifications that happened since a prior indexing). The number of catalog engine micro-services (the file metadata services hosted within cloud compute instances) may be dynamically modified based upon a current demand to catalog metadata for storage within the catalog server 544. The number of catalog engine micro-services may be horizontally scaled on-demand for multiple file catalog instances During operation 404 of method 400 of FIG. 4, the set of catalog engine micro-services 528 (the file metadata services hosted within cloud compute instances) may evaluate the metadata to identify constant attributes and modifiable attributes of the files associated with the unstructured data for which the metadata was retrieved by the catalog ingestion engine 516 from the data sources 520 for cataloging by the set of catalog engine micro-services 528. The constant attributes may be attributes that remain constant and do not change over a lifespan of the files. For example, the constant attributes may comprise an inode attribute of a file, a creation time attribute of the file, a file path attribute of the file, a cluster identifier attribute of a cluster at which the file is stored according to the file path attribute, a volume identifier attribute of a volume within which the file is stored, etc. The modifiable attributes may be attributes that can change over a lifespan of the files, such as a size of a file, a last accessed time of the file, a last modified time of the file, etc.

During operation 406 of method 400 of FIG. 4, a file index of a file catalog stored within the catalog server 544 by one or more nodes within the distributed search and analytics cluster 546 may be populated with the constant attributes in a format corresponding to a catalog engine schema. A file index may have various attributes that do not change over a lifetime of a file other than a delete sequence number that is updated when the file is deleted. Such attributes may correspond to a file global unique identifier (a file GUID) (e.g., generated as a hash of other attributes in the index, such as a storage cluster UUID, a storage volume UUID, a fully qualified file path, and/or an inode number), the storage cluster UUID, the storage volume UUID, the fully qualified file path, the inode number, a created time, a create sequence number of a snapshot, a delete sequence number of a snapshot, an IsMock attribute (e.g., whether a mock entry is created to handle directory rename/delete use cases), a type of file (e.g., a regular file or a directory), etc. The file version index has attributes that could change over time, other than a file GUID UUID. These attributes may correspond to the file GUID UUID, a file size, a modified time, a last accessed time, an inode modification time, a snapshot identifier (e.g., an identifier of a snapshot which brought the file version information), a number of links to the file, an owner user ID, an owner group ID, a snapshot sequence number, etc.

In an embodiment, one or more of the file metadata services hosted by the cloud compute instances of the set of catalog engine micro-services 528 may populate the file index with the constant attributes. The constant attributes of a file may be hashed to create a global identifier (e.g., a globally unique identifier) for the file, which may be subsequently used to access and/or refer to the file. Any number of file indexes 562 (e.g., file index partitions) may be stored within any number of file catalogs 560.

During operation 408 of method 400 of FIG. 4, a file version index of the file catalog stored within the catalog server 544 by one or more nodes within the distributed search and analytics cluster 546 may be populated with the modifiable attributes in the format corresponding to the catalog engine schema. Any number of file version indexes 564 (e.g., file version index partitions) may be stored within any number of file catalogs 560. In an embodiment, one or more of the file metadata services hosted by the cloud compute instances of the set of catalog engine micro-services 528 may populate the file version index with the modifiable attributes. Sets of modifiable attributes for a file may be stored as different versions of the file within the file version index. For example, a first set of modifiable attributes of a file may be stored as a first file version of the file corresponding to attributes of the file at a first point in time. A second set of modifiable attributes of the file may be stored within the file version index as a second version of the file corresponding to attributes of the file at a second point in time. The first set of modifiable attributes may be retained as the first version of the file within the file version index, and thus multiple versions of the file may be concurrently maintained within the file version index. In this way, the file version index may store multiple sets of modifiable attributes of a file as file versions of the file (e.g., the first file version may have a last modified time attribute and size attribute that is different than a last modified time attribute and size attribute of the second file version due to modification of the file between the first point in time and the second point in time).

In an embodiment, a set of modifiable attributes of the file may be stored within the file version index as a current file version of the file. The set of modifiable attributes may be identified based upon a comparison of a first snapshot of a volume comprising the file and a second snapshot (e.g., a latest snapshot) of the volume taken subsequent the first snapshot. The set of modifiable attributes may be identified based upon the comparison indicating that the file has been modified since the first snapshot.

In an embodiment, the file index and/or the file version index may be automatically partitioned based upon various criteria, such as when metadata of a threshold number of files has been cataloged within the file catalog. Automatic partitioning allows for horizontal scaling out of catalog data. Automatic partitioning also ensures that writes to the file catalog are executed upon a current live partition of the file index and/or the file version index, while reads/searches on file metadata to can span all partitions of the file index and/or the file version index of the file catalog to enable full path global searches.

In an example, the file version index may be partitioned, in response to a threshold number of file versions of the files being stored within the file version index, to create a new file version index into which modifiable attributes of subsequent versions of the files are stored. The new file version index may become a current live partition of the file version index into which the modifiable attributes of subsequent versions of the files are stored (e.g., writes, reads, and/or searches may be directed to the new file version index), and the partitioned off file version index may become a non-active file version index (e.g., merely reads and searches are directed to the partitioned off file version index), which may be archived and/or tiered out to relatively lower cost long term storage. In this way, the file version index may store a history of file metadata as time-series based information (e.g., as new versions of a file are created over time, new entries may be populated within the file version index for the new file versions). Automated partitioning of the file version index allows for older file version metadata within non-active file version index partitions to be tiered out to lower cost storage, such as cloud storage, in order to reduce file catalog storage costs.

In an example, the file index may be partitioned, in response to constant attributes of a threshold number of files being stored within the file index, to create a new file index into which constant attributes of subsequently identified files are stored. The new file index may become a current live partition of the file index into which the constant attributes of subsequently identified files are stored (e.g., writes, reads, and/or searches may be directed to the new file index), and the partitioned off file index may become a non-active file index (e.g., merely reads and searches are directed to the partitioned off file index), which may be archived and/or tiered out to relatively lower cost long term storage. Also, file searches for a particular file version of a specific file (e.g., for a use case, such as a file recovery use case) may be quickly performed on-demand because files are uniquely identified using the global identifiers derived from the constant attributes (e.g., a hash of the constant attributes), such as full file path, storage volume, storage cluster, creation time, and/or other key invariant attributes.

A service 502 may provide various functionality to clients (e.g., a client device, a storage operating system of a node, etc.) through an API 506 made accessible to the clients, such as a client 504. In an embodiment, file restore functionality 508 may be provided through the API 506. The file restore functionality 508 may allow the client 504 to locate a file and/or a particular version of that file stored within a particular data source of the data sources 520 utilizing a file index and file version index of the file catalog. Once located, the file restore functionality 508 may allow the client 504 to retrieve and restore the file and/or particular version of the file to a destination location.

In an embodiment, global search functionality 510 may be provided through the API 506. The global search functionality 510 may allow the client 504 to locate a file and/or a particular version of that file stored within the data sources 520 utilizing the file index and/or the file version index of the file catalog. In an embodiment, backup browse functionality 512 may be provided through the API 506. The backup browse functionality 512 may allow the client 504 to browse backups, such as snapshots, of files and/or file versions utilizing the file index and/or the file version index of the file catalog. For example, the file index and the file version index of the file catalog may be utilized to construct a browsing interface (e.g., a graphical user interface) through which backups (snapshots) of files and file versions stored across the data sources 520 can be viewed. The client 504 may utilize the browsing interface to perform various types of actions upon the backups, such as accessing a particular file version of a file, restoring the file version of the file to a destination, request a report regarding information about the file and/or other files. In an example, the browsing interface may be displayed as a navigable file and directory structure that a user can interactively browse through backups (e.g., a snapshot may be a backup of a primary file system at a point in time, and thus a file system captured within the snapshot may be navigated through the browsing interface).

In an embodiment, file insight functionality 514 may be provided through the API 506. The file insight functionality 514 may generate various reports for the client 504. In an example, a request may be received from the client 504 through the API 506 for a report of files across the data sources 520 that have been modified greater than or less than a frequency. Accordingly, the file insight functionality 514 may evaluate the file index and file version index of the file catalog to identify a set of files that are modified greater than or less than the frequency. In this way, the file insight functionality 514 generates a report regarding the set of files, and provides the report to the client 504.

In an example, a request may be received from the client 504 through the API 506 for a report of files across the data sources 520 that have sizes greater than or smaller than a threshold size. Accordingly, the file insight functionality 514 may evaluate the file index 562 and file version indexes 564 of the file catalogs 560 to identify a set of files that have sizes greater than or smaller than the threshold size. In this way, the file insight functionality 514 generates a report regarding the set of files, and provides the report to the client 504. It may be appreciated that a wide variety of reports may be generated for files stored across the data sources 520, such as based upon file types (e.g., how may files have a certain file type), how recently files were accessed or modified, analysis reports (e.g., analyze access patterns to files), compliance reports (e.g., a report to ensure that a certain number of backups are being retained for a file system; a report to ensure that backup data of a file system is retained for at least a compliance timespan, etc.), and/or other types of reports may be provided to the client 504.

In an embodiment, a request for a file (e.g., a particular version of the file) may be received from the client 504 through the API by the service 502. The file index and the file version index may be evaluated to identify a location of the file within a data source of the data sources 520. For example, a file path attribute, a cluster identifier attribute, a volume identifier attribute, an inode attribute, a creation time attribute, and/or other attributes populated within the file index and/or the file version index may be used to identify a location of a requested version of the file (e.g., a cluster and/or volume comprising backup data of the requested file version of the file at a particular file path). In an example, the request may comprise file arguments (e.g., a file path, an inode, creation time, volume identifier, cluster identifier, etc.) that may be used to recreate (e.g., a hash of the file arguments) a global identifier for the requested version of the file. The global identifier may be utilized to retrieve the requested file version of the file. In this way, access the file (access to the request file version of the file) may be provided utilizing the file index and the file version index, during operation 410 of method 400 of FIG. 4.

The file indexes 562 (e.g., file index partitions) and/or the file version indexes 564 (e.g., file version index partitions) may be updated based upon the occurrence of various operations. In an example, a determination may be made that a snapshot has been deleted from a data source of the data sources 520. Accordingly, one or more file versions associated with files of the deleted snapshot may be deleted from a file version index. In another example, a determination may be made that a directory has been modified within a data source of the data sources 520. Accordingly, affected files may be identified, and the file version index may be modified based upon the affected files.

FIG. 6 illustrates an example method 600 for processing a snapshot create notification indicating that a snapshot has been created and that metadata of the snapshot is to be ingested and stored within a file index and/or a file version index of a file catalog, during operation 602 of method 600 of FIG. 6. In response to receiving the snapshot create notification, a snapshot sequence of the snapshot may be computed (e.g., a plurality of snapshots may be sequentially created over time according to a particular snapshot sequence such that the sequence is an nth snapshot), during operation 604 of method 600 of FIG. 6. That is, each snapshot of a volume is assigned an ordered, auto-incremented sequence number, which may start from 0. So, a baseline snpashot of the volume has a sequence number of 0 and subsequent snapshots will have incremental sequence numbers such as 1, 2, 3, etc. The snapshot details (e.g., the snapshot sequence, a creation date of the snapshot, what volume and/or location of data is captured by the snapshot, a name of the snapshot, a location of the snapshot within a data source, etc.) may be persisted within a mapping index. Metadata files for a snapshot ID of the snapshot may be fetched, during operation 606 of method 600 of FIG. 6.

Each file associated with the snapshot (e.g., metadata files) may be processed, during operation 608 of method 600 of FIG. 6. For example, a file (e.g., a metadata file) may be read, during operation 610 of method 600 of FIG. 6. An identifier for an entry within the file may be computed (e.g., a hash identifier for each entry within the file may be calculated), during operation 612 of method 600 of FIG. 6. The metadata file may be processed based upon whether the entry indicates that a create operation, a modify operation, or a delete operation (e.g., a file is created, deleted, or modified) occurred with respect to the creation of the snapshot, during operation 614 of method 600 of FIG. 6. For a create operation, a record is inserted into the file index with the identifier of the file and into the file version index with a default elastic identifier (e.g., an auto generated identifier). For a modify operation, a record is inserted into the file version index with a default elastic identifier. For a delete, a record is assed into the file version index with a default elastic identifier and a record is made of file identifiers within a delete list. In this way, the file index and the file version index may be processed (updated) based upon what type of operation occurred with respect to the file, during operation 616 of method 600 of FIG. 6. A state of file ingestion success associated with a catalog ingestion engine (e.g., the catalog ingestion engine 516 of FIG. 5) may be updated based upon the snapshot being cataloged, and post ingestion activities may be performed, during operation 618 of method 600 of FIG. 6. A post ingestion activity may check to see if a directory delete or rename has occurred. If so, then the file catalog file files under the specific directory are processed. For example, if a directory is deleted, then a single directory delete event is generated and files under the directory are calculated from an existing file index and are marked at deleted.

FIG. 7 illustrates an example method 700 for processing a snapshot delete notification received in order. During operation 702 of method 700 of FIG. 7, the snapshot delete notification is received. During operation 704 of method 700 of FIG. 7, files associated with a file version that satisfy a criteria are fetched. In an example, the criteria may correspond to where [Sequence of the snapshot=DeleteSequence+1] and [ChangeType=Modify or Delete]. Each snapshot is assigned a sequence (a sequence number). A file has a create snapshot sequence (e.g., a sequence number of a snapshot which first brought the file creation event) and a delete snapshot sequence (e.g., a sequence number of a snapshot which brought the file deletion event). These sequences are used as part of the criteria. During operation 706 of method 700 of FIG. 7, the files are deleted from the file version. During operation 708 of method 700 of FIG. 7, a sequence check is performed, such as an additional check [Sequence <=DeleteSequence].

FIG. 8 illustrates an example method 800 for processing a snapshot delete notification received out of order. During operation 802 of method 800 of FIG. 8, the snapshot delete notification is received. During operation 804 of method 800 of FIG. 8, a non-deleted ancestor snapshot and a successor snapshot sequence (e.g., ancestor and successor snapshots with respect to the snapshot that has been deleted) are fetched from a snapshot mapping index. In an example, the non-deleted ancestor snapshot and the successor snapshot are assigned to variables prevNonDeletedSequence and nextNonDeletedSequence. During operation 806 of method 800 of FIG. 8, files associated with a file version that satisfy a criteria are fetched. In an example, the criteria may correspond to where [Sequence of the snapshot=nextNonDeletedSequence] and [ChangeType=Modify or Delete]. During operation 808 of method 800 of FIG. 8, the files are deleted from the file version index if a condition is satisfied. In an example, the condition may correspond to where the Sequence of the snapshot is between the prevNonDeletedSequence and the nextNonDeletedSequence.

FIG. 9 illustrates an example method 900 for handling a directory being deleted. During operation 902 of method 900 of FIG. 9, a list of directory delete events associated with a snapshot is obtained. During operation 904 of method 900 of FIG. 9, a determination is made that no create event exists for a same inode number and creation time in the snapshot with respect to each deleted directory. During operation 906 of method 900 of FIG. 9, a delete directory list is obtained. During operation 908 of method 900 of FIG. 9, children of a deleted directory are obtained (e.g., directories and/or files within the deleted directory), and the children of the deleted directory are updated as deleted in a file index. During operation 910 of method 900 of FIG. 9, mock delete events for the children are inserted into a file version index.

FIG. 10 illustrates an example method 1000 for handling a directory being renamed. During operation 1002 of method 1000 of FIG. 10, a list of directory delete events associated with a snapshot is obtained. During operation 1004 of method 1000 of FIG. 10, a determination is made that a create event exists for a same inode number and creation time in the snapshot with respect to at least one deleted directory. During operation 1006 of method 1000 of FIG. 10, a renamed directory list may be obtained and sorted by path. During operation 1008 of method 1000 of FIG. 10, children of a deleted directory are obtained, and mock create events for the children are inserted into a file index with a new path. During operation 1010 of method 1000 of FIG. 10, mock create events for the children are inserted into a file version index with a new file identifier. During operation 1012 of method 1000 of FIG. 10, the children of the deleted directory are updated as deleted in the file index. During operation 1014 of method 1000 of FIG. 10, mock delete events for the children are inserted into the file version index.

Figure 11:
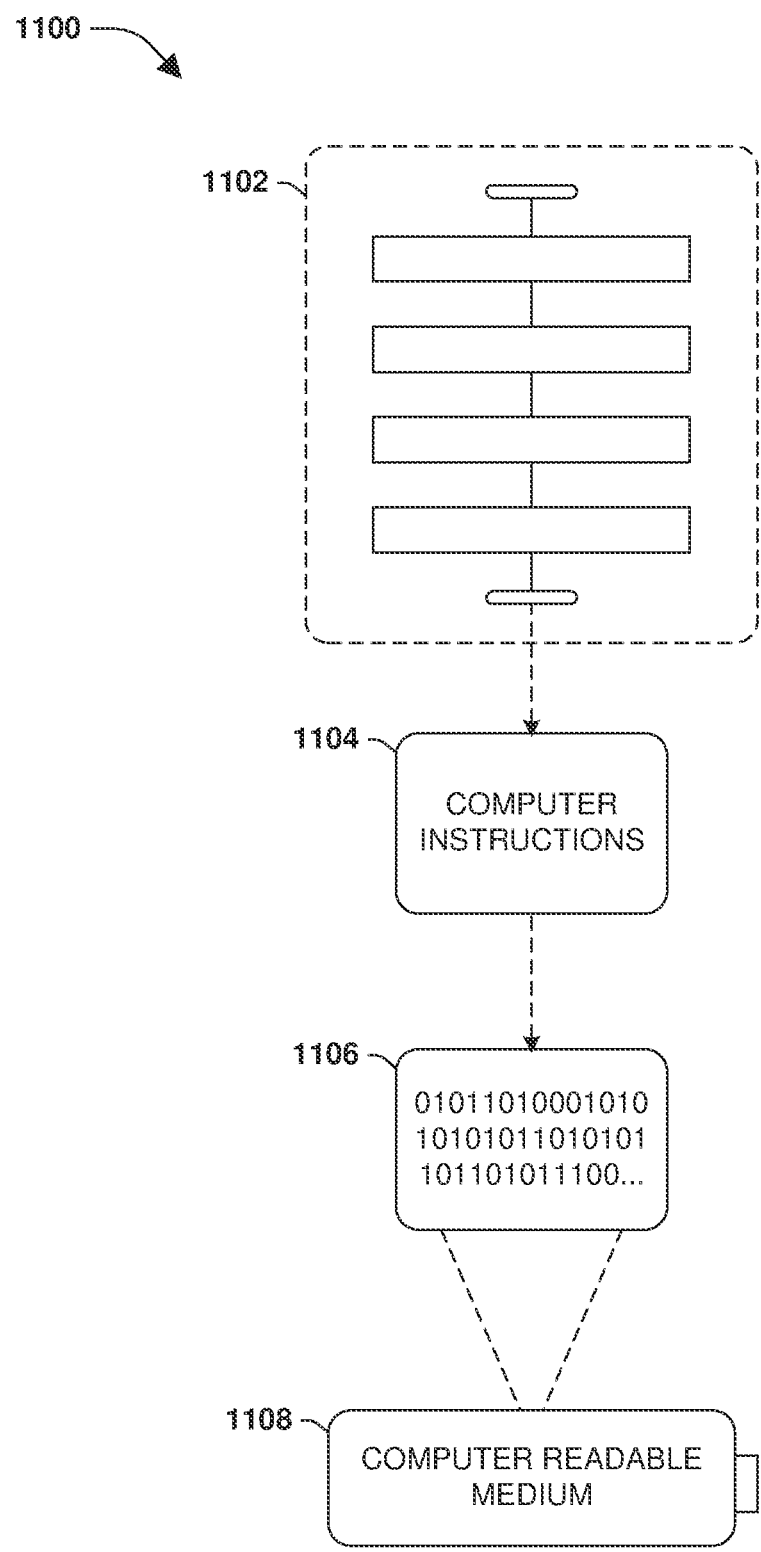
FIG. 11 is an example of a computer readable medium in which an embodiment of the invention may be implemented.

Still another embodiment involves a computer-readable medium 1100 comprising processor-executable instructions configured to implement one or more of the techniques presented herein. An example embodiment of a computer-readable medium or a computer-readable device that is devised in these ways is illustrated in FIG. 11, wherein the implementation comprises a computer-readable medium 1108, such as a compact disc-recordable (CD-R), a digital versatile disc-recordable (DVD-R), flash drive, a platter of a hard disk drive, etc., on which is encoded computer-readable data 1106. This computer-readable data 1106, such as binary data comprising at least one of a zero or a one, in turn comprises processor-executable computer instructions 1104 configured to operate according to one or more of the principles set forth herein. In some embodiments, the processor-executable computer instructions 1104 are configured to perform a method 1102, such as at least some of the exemplary method 400 of FIG. 4, at least some of the exemplary method 600 of FIG. 6, at least some of the exemplary method 700 of FIG. 7, at least some of the exemplary method 800 of FIG. 8, at least some of the exemplary method 900 of FIG. 9, at least some of the exemplary method 1000 of FIG. 10, for example. In some embodiments, the processor-executable computer instructions 1104 are configured to implement a system, such as at least some of the exemplary system 500 of FIG. 5, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   evaluating metadata to identify constant attributes that remain constant over a lifespan of files and modifiable attributes modifiable over the lifespan of the files;
   populating a file index of a file catalog with the constant attributes in a format corresponding to a catalog engine schema, wherein an entry within the file index for a file is populated with the constant attributes and a global identifier created for the file based upon the constant attributes;
   populating a file version index of the file catalog with the modifiable attributes as file versions of the files according to the catalog engine schema, wherein the file version index includes:
      a first entry created for the file based upon a first snapshot of the file at a first point in time, the first entry comprising the global identifier and a first set of modifiable attributes for the file; and
      a second entry created in response to a comparison of the first snapshot and a second snapshot of the file at a second point in time indicating a modification to the file, the second entry comprising the global identifier and a second set of modifiable attributes;
   in response to a threshold number of file versions being stored within the file version index, partitioning the file version index to create a new file version index;
   in response to receiving a request for the file, querying the file index and the file version index using the global identifier to identify a location, of the file within a data source, using attributes within the file index and the file version index; and
   providing access to the file at the location within the data source utilizing the global identifier for the file created based upon the constant attributes.

2. The method of claim 1, comprising:
   creating the global identifier for the file based upon a hash of the constant attributes.

3. The method of claim 2, comprising:
   recreating the global identifier using file arguments within the request.

4. The method of claim 1, wherein the constant attributes comprise at least one of an inode attribute of the file, a creation time attribute of the file, a file path attribute of the file, a cluster identifier attribute of a cluster at which the file is stored, or a volume identifier attribute of a volume within which the file is stored.

5. The method of claim 1, comprising:
   storing, within the file version index, the first set of modifiable attributes as a first file version of the file corresponding to attributes of the file at the first point in time.

6. The method of claim 5, comprising:
   storing, within the file version index, the second set of modifiable attributes as a second version of the file corresponding to attributes of the file at the second point in time, wherein the first set of modifiable attributes are retained within the file version index.

7. The method of claim 1, wherein the file version index stores sets of modifiable attributes as file versions of the file.

8. The method of claim 1, comprising
   partitioning the file version index to create the new file version index into which modifiable attributes of subsequent versions of the files are stored.

9. The method of claim 1, comprising:
   storing, within the file version index, a set of modifiable attributes as a current file version of a first file based upon a comparison of first snapshot of a volume comprising the first file and the second snapshot of the volume indicating that the first file has been modified since the first snapshot.

10. A non-transitory machine readable medium comprising instructions for performing a method, which when executed by a machine, causes the machine to:
    evaluate metadata to identify constant attributes that remain constant over a lifespan of files and modifiable attributes modifiable over the lifespan of the files;
    populate a file index of a file catalog with the constant attributes in a format corresponding to a catalog engine schema, wherein an entry within the file index for a file is populated with the constant attributes and a global identifier created for the file based upon the constant attributes;
    populate a file version index of the file catalog with the modifiable attributes as file versions of the files according to the catalog engine schema, wherein the file version index includes:
       a first entry created for the file based upon a first snapshot of the file at a first point in time, the first entry comprising the global identifier and a first set of modifiable attributes for the file; and wherein a second entry created in response to a comparison of the first snapshot and a second snapshot of the file at a second point in time indicating a modification to the file, the second entry comprising the global identifier and a second set of modifiable attributes;

in response to a threshold number of file versions being stored within the file version index, partition the file version index to create a new file version index;

in response to receiving a request for the file, query the file index and the file version index using the global identifier to identify a location, of the file within a data source, using attributes within the file index and the file version index; and provide access to the file at the location within the data source utilizing the global identifier for the file created based upon the constant attributes.

11. The non-transitory machine readable medium of claim 10, wherein the instructions cause the machine to:

in response to receiving a report request for a report of files across one or more data sources that are modified above a frequency, evaluate the file index and the file version index to identify a set of files that are modified above the frequency for inclusion with the report.

12. The non-transitory machine readable medium of claim 10, wherein the instructions cause the machine to:

in response to receiving a report request for a report of files across one or more data sources that have sizes greater than a threshold size, evaluate the file index and the file version index to identify a set of files with sizes greater than the threshold size for inclusion with the report.

13. The non-transitory machine readable medium of claim 10, wherein the instructions cause the machine to:

in response to receiving a restore request to restore a file version of the file, evaluate the file index and the file version index to obtain the file version of the file from the data source.

14. The non-transitory machine readable medium of claim 10, wherein the instructions cause the machine to:

utilize the file index and the file version index to construct a browsing interface through which backups of files stored across one or more data sources can be viewed and through which actions can be performed upon the backups.

15. The non-transitory machine readable medium of claim 10, wherein the instructions cause the machine to:

dynamically modify an amount of resources allocated for a catalog ingestion engine to retrieve the metadata, describing attributes of unstructured file data stored at one or more data sources, based upon a current demand for ingesting the metadata.

16. A computing device comprising:

a memory comprising machine executable code for performing a method; and a processor coupled to the memory, the processor configured to execute the machine executable code to cause the processor to:

evaluate metadata to identify constant attributes that remain constant over a lifespan of files and modifiable attributes modifiable over the lifespan of the files;

populate a file index of a file catalog with the constant attributes in a format corresponding to a catalog engine schema, wherein an entry within the file index for a file is populated with the constant attributes and a global identifier created for the file based upon the constant attributes;

populate a file version index of the file catalog with the modifiable attributes as file versions of the files according to the catalog engine schema, wherein the file version index includes:

a first entry created for the file based upon a first snapshot of the file at a first point in time, the first entry comprising the global identifier and a first set of modifiable attributes for the file; and a second entry created in response to a comparison of the first snapshot and a second snapshot of the file at a second point in time indicating a modification to the file, the second entry comprising the global identifier and a second set of modifiable attributes;

in response to a threshold number of file versions being stored within the file version index, partition the file version index to create a new file version index;

in response to receiving a request for the file, query the file index and the file version index using the global identifier to identify a location, of the file within a data source, using attributes within the file index and the file version index; and provide access to the file at the location within the data source utilizing the global identifier for the file created based upon the constant attributes.

17. The computing device of claim 16, wherein a set of catalog engine micro-services are maintained for cataloging the metadata, and wherein the machine executable code causes the processor to:

dynamically modify a number of catalog engine micro-services based upon a current demand.

18. The computing device of claim 16, wherein a set of node are maintained for hosting a catalog server, and wherein the machine executable code causes the processor to:

dynamically modify a number of nodes used to host the catalog server based upon one or more parameters.

19. The computing device of claim 16, wherein the machine executable code causes the processor to:

in response to determining that a snapshot has been deleted, delete one or more file versions from the file version index.

20. The computing device of claim 16, wherein the machine executable code causes the processor to:

in response to determining that a directory has been modified, identify an affected file and modifying the file version index based upon the affected file.

* * * * *